US012361345B2

United States Patent
Ramamoorthy et al.

(10) Patent No.: US 12,361,345 B2
(45) Date of Patent: Jul. 15, 2025

(54) SYSTEM AND METHOD FOR CLUSTERED PRICING FOR TASK PRICE ESTIMATES

(71) Applicant: Verizon Patent and Licensing Inc., Basking Ridge, NJ (US)

(72) Inventors: Lokesh Ramamoorthy, Chennai (IN); Ebenezer Bardhan, Chennai (IN); Goutham Kumar Chikoti, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 155 days.

(21) Appl. No.: 17/895,138

(22) Filed: Aug. 25, 2022

(65) Prior Publication Data
US 2024/0070569 A1 Feb. 29, 2024

(51) Int. Cl.
*G06Q 10/06* (2023.01)
*G06Q 10/063* (2023.01)
*G06Q 30/0201* (2023.01)

(52) U.S. Cl.
CPC ....... *G06Q 10/063* (2013.01); *G06Q 30/0201* (2013.01); *G06Q 30/0206* (2013.01)

(58) Field of Classification Search
CPC .................................................. G06Q 10/06
USPC ....................................................... 705/7.11
See application file for complete search history.

(56) References Cited

U.S. PATENT DOCUMENTS

| | | | |
|---|---|---|---|
| 2003/0023470 A1* | 1/2003 | Labbi | G06Q 10/06313 705/7.23 |
| 2015/0317582 A1* | 11/2015 | Nath | G06Q 10/06311 705/7.13 |
| 2020/0104230 A1* | 4/2020 | Hasija | G06F 11/3072 |
| 2023/0027594 A1* | 1/2023 | Esmalifalak | G06Q 10/0635 |
| 2023/0078389 A1* | 3/2023 | Knuff | G06N 5/04 705/7.23 |
| 2023/0142105 A1* | 5/2023 | Pita | G06F 18/23213 705/7.23 |
| 2023/0206143 A1* | 6/2023 | Foufa | G06Q 10/06311 705/7.13 |
| 2023/0229986 A1* | 7/2023 | Cami | G06Q 10/06312 705/7.15 |
| 2023/0316172 A1* | 10/2023 | Ayat | G06F 40/20 705/7.13 |
| 2023/0376800 A1* | 11/2023 | Zhu | G06N 20/00 |
| 2023/0401500 A1* | 12/2023 | Pita | G06Q 50/08 |
| 2023/0401541 A1* | 12/2023 | Housseini | G06N 5/022 |
| 2024/0028403 A1* | 1/2024 | Biswas | G06F 9/5027 |

* cited by examiner

*Primary Examiner* — Nga B Nguyen

(57) ABSTRACT

The present teaching relates to method, system, medium, and implementations for job pricing. When receiving information about a new task of a job type, a mixture model representing historic job completion data and including multiple cluster-based models is used to predict job pricing. The multiple cluster-based models characterize corresponding multiple clusters identified from historic job completion data and are used to generate multiple predictions of duration to complete the new task. The predictions generated based on the cluster-based models are integrated based on the mixture model to generate an overall job pricing estimate for the new task.

20 Claims, 16 Drawing Sheets

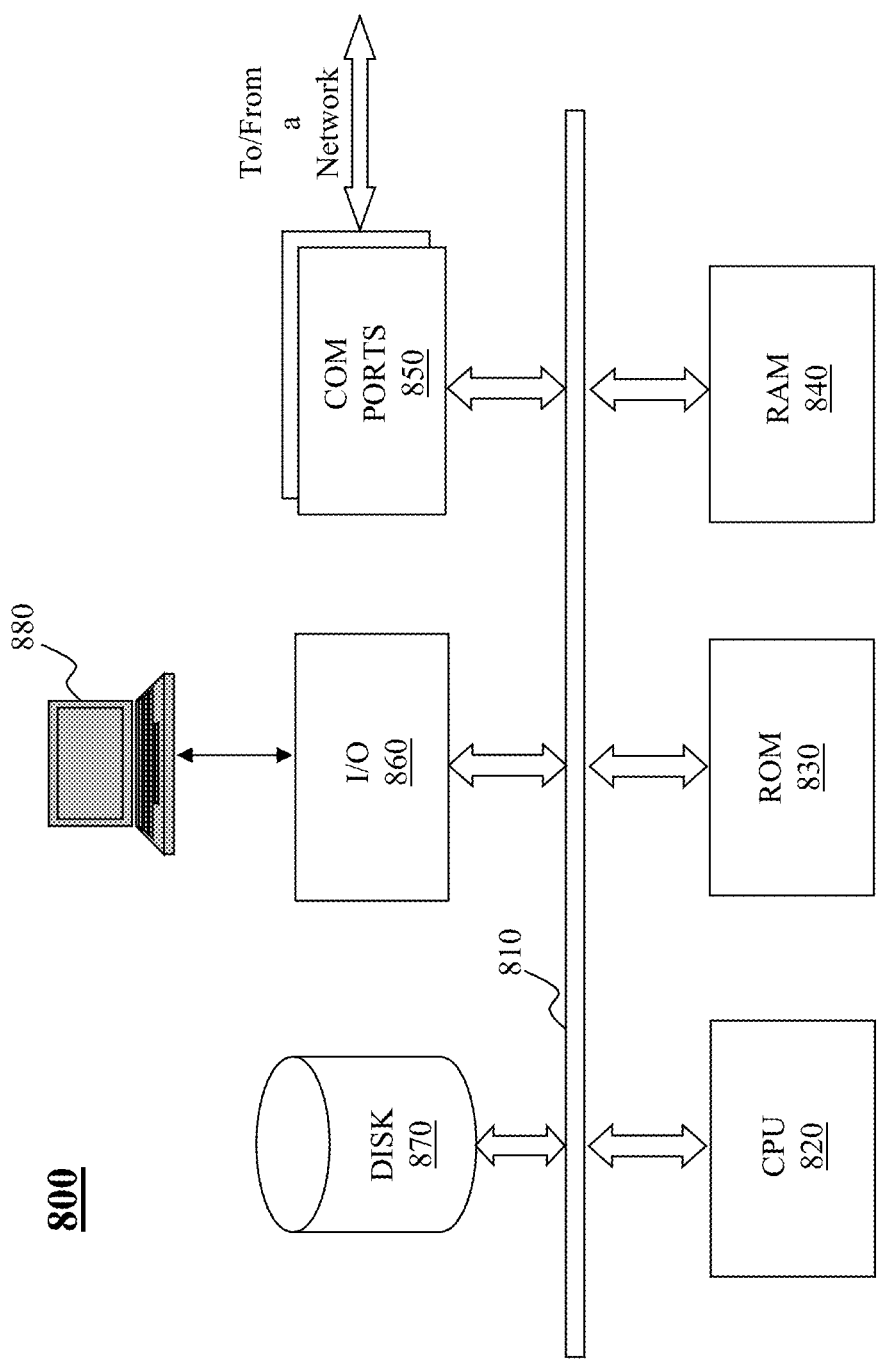

SYSTEM AND METHOD FOR CLUSTERED PRICING FOR TASK PRICE ESTIMATES

BACKGROUND

In some industries, the workforce is organized by allocating jobs to individuals or teams to complete within an estimated time. Estimating the time needed to complete a task is called job pricing. To many organizations accurately estimating job completion is an important part of the operation of the organization as a whole.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is an illustrative diagram of an exemplary computing device architecture that may be used to realize a specialized system implementing the present teaching in accordance with various embodiments.

DETAILED DESCRIPTION OF EXAMPLE EMBODIMENTS

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or systems have been described at a relatively high-level, without detail, in order to avoid unnecessarily obscuring aspects of the present teachings.

Figure 1:
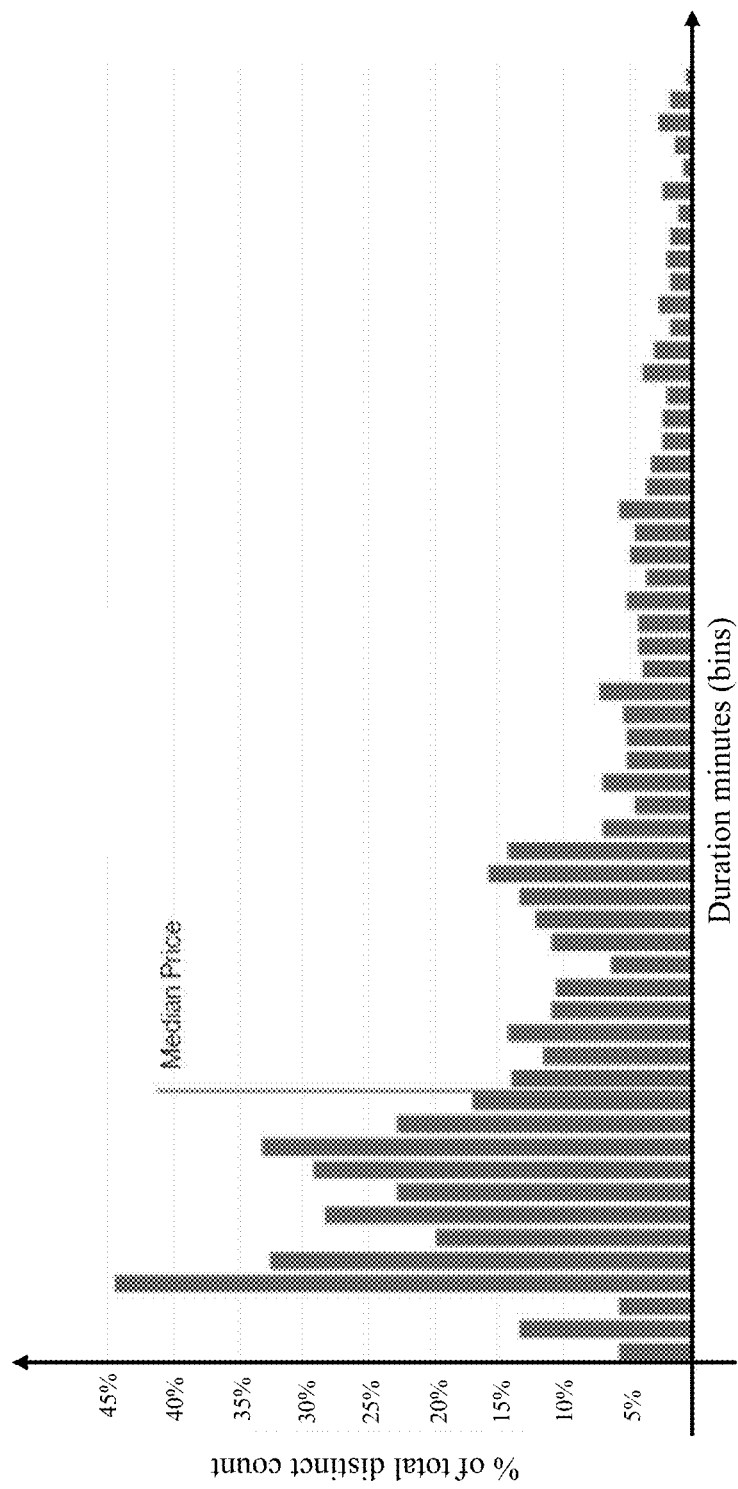
FIG. 1 shows an example distribution of job completion statistics.

The present teaching is directed to job pricing prediction with cluster-based mixture models derived based on historic job completion statistics. Job pricing is used to manage cost in business operations such as in fleet management in its operation of, e.g., equipment installation at customers' sites, maintenance at customer sites, or setting up operation centers, etc. Job pricing is a critical component of work planning, scheduling, and resource allocation. A job may take different people or teams different amounts of time to complete. The same type of job performed at different times by the same person may also take different amounts of time, e.g., when the operation has an updated procedure. Such variations may be due to a variety of reasons which increases the level of difficulty in pricing a job. FIG. 1 illustrates an example distribution of job completion statistics, with the X-axis denoting duration organized in terms of, e.g., minute bins, and the Y-axis denoting the % of total distinct count collected from past job completion situations. As seen, the distribution is spread over a wide range of durations. Traditionally, such a distribution has been used as the basis for job pricing by, e.g., determining the mean or median of the distribution and using it as an estimate of the average duration to complete the same type of job. This conventional single-point statistic of the distribution cannot accurately capture the characteristics of the distribution and as such, conventional analyses often fail to offer an adequately satisfactory framework for accurately calculating job pricing (e.g., time to complete a job).

Figure 2A:
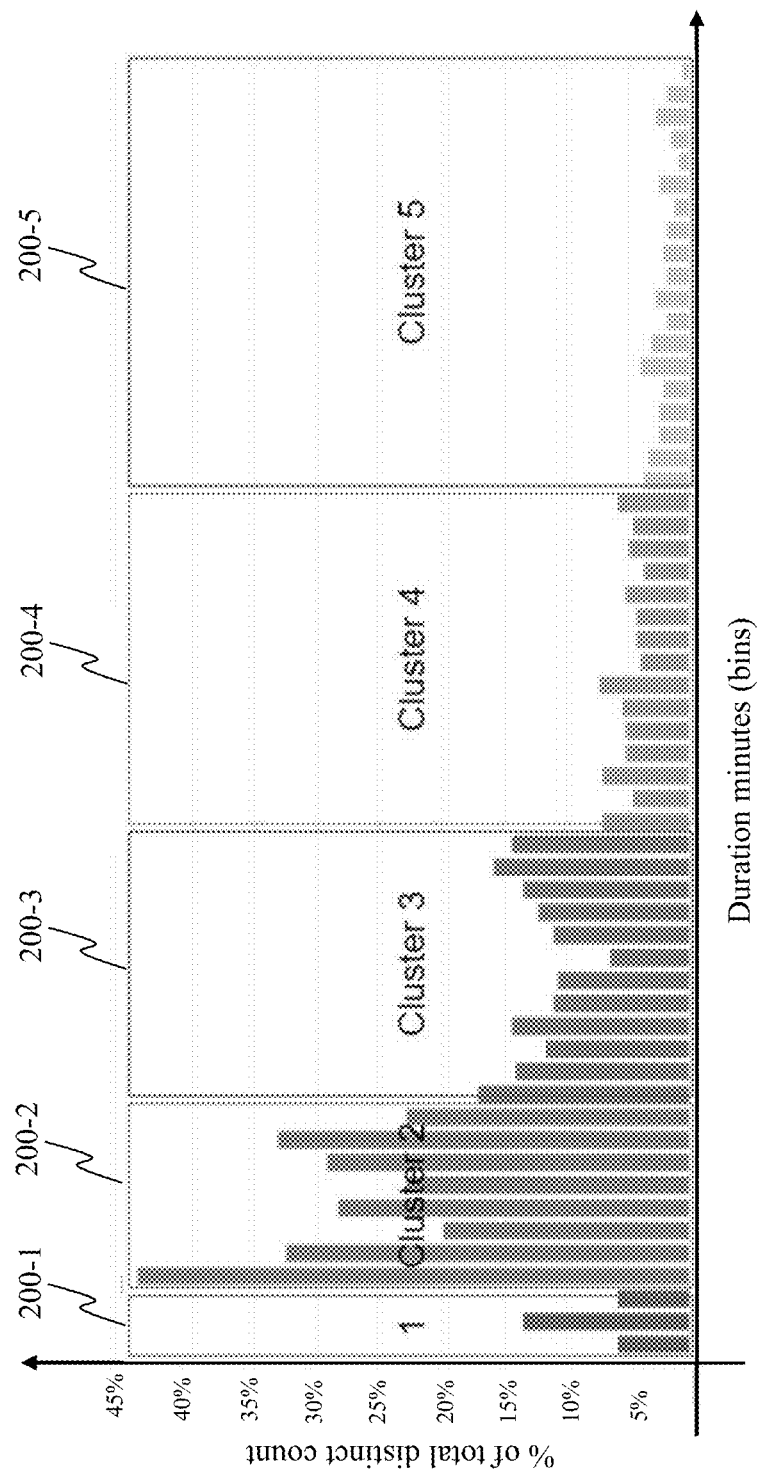
FIG. 2A depicts an exemplary number of clusters identified from a distribution of job completion statistics, in accordance with an embodiment of the present teaching.

The present teaching improves the current state of job pricing by leveraging simultaneous modeling of multiple clusters identified from a job completion distribution. FIG. 2A depicts a distribution of job completion statistics with an exemplary number of clusters identified therefrom, in accordance with an embodiment of the present teaching. The multiple clusters associated with a distribution may be identified through data analysis such as unsupervised clustering, which allows adaptive determination of the number of clusters according to characteristics of the distribution such as, e.g., distribution data, density, and centroid of the data. Statistical approaches may be adopted in unsupervised clustering to estimate the number of clusters.

Figure 2B:
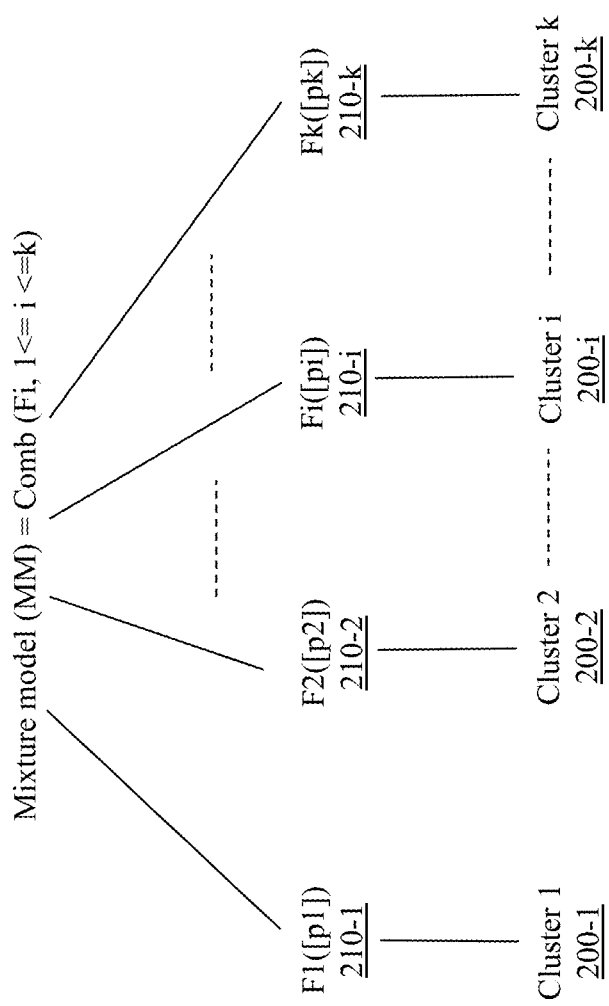
FIG. 2B depicts a mixture model (MM) having multiple functions characterizing different clusters included in a distribution of job completion statistics, in accordance with an embodiment of the present teaching.

Each of the multiple clusters may be individually modeled using an appropriate function and, together, the multiple functions modeling the multiple clusters may be used to form a mixture model for accurately capturing the characteristics of the overall distribution. FIG. 2B depicts a mixture model (MM) having multiple functions characterizing different clusters included in a distribution of completion statistics, in accordance with an embodiment of the present teaching. A mixture model corresponds to a combination of k functions, Fi, $1<=i<=k$, labeled as 210-1, 210-2, ..., 210-i, ..., and 210-k. Each function is denoted as Fi([pi]), where Fi( ) is the function (e.g., a Gaussian function) and [pi] corresponds to a set of parameters of the function (e.g., a mean and a variance of a Gaussian function). Each function is provided to characterize or model a corresponding cluster of data points. For instance, as shown in FIG. 2B, function F1([p1]) models cluster 1 200-1, F2([p2]) for cluster 2 200-2, ..., Fi([pi]) for cluster i, ... and Fk([pk]) for cluster k 200-k.

In some aspects of the present teaching, each identified cluster may be enhanced. In some embodiments, cluster-based enhancement may be achieved based on the function modeling the cluster via Monte Carlo simulations. In some embodiments, a cluster may be enhanced via data bootstrapping without relying on the function modeling the cluster. In some embodiments, the enhanced clusters may then be used to further refine the functions used to model the clusters. When a job completion distribution is represented via multiple clusters and each of the clusters is modeled separately using an appropriate function, the characteristics associated with each cluster may be accurately captured. Given that, a mixture model using multiple functions modeling such clusters may more precisely model the job completion distribution.

The mixture model as generated in accordance with the present teaching may be utilized to predict job pricing estimates in a more accurate and reliable manner. According to the present teaching, each of the cluster-based functions included in the mixture (that models a corresponding cluster of an overall distribution) may be used to predict an individual job pricing estimate and different predictions generated using different cluster-based functions may then be integrated or combined to generate an overall job pricing estimate. Different integration schemes may be used for combining different predictions from cluster-based functions. In some embodiments, a weighted sum of the cluster-based predictions may be used where weights with respect to each prediction may be determined. In some embodiments, a weight associated with a prediction may be inversely proportional to the distance between the prediction to, e.g., the median, of the distribution. In some embodiments, the weight may be determined based on the percent of the data points in the underlying cluster. In some situations, the weight may also be adjusted based on a distance between the prediction and the centroid of the underlying cluster (e.g., measured via the number of variances from the center of a Gaussian function). Other non-linear integration schemes may also be adopted, including using a non-linear function to combine predictions or using a neural network to implicitly combine predictions where the embeddings of the neural network may be obtained via machine learning based on historic job completion data.

Figure 2C:
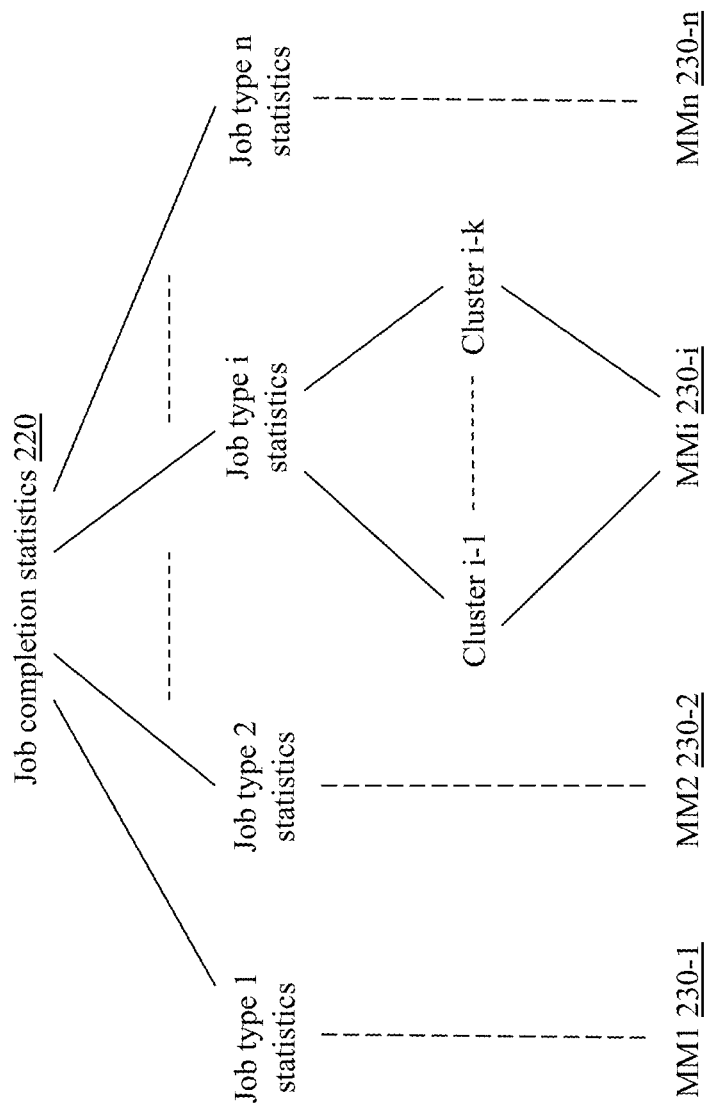
FIG. 2C depicts an exemplary organization of job completion statistics via job type and mixture models utilized for characterizing job completion distribution associated with each job type, in accordance with an embodiment of the present teaching.

Each mixture model is obtained to characterize a job completion distribution related to a given type of job. When there are different types of jobs, the present teaching may be applied to each type of job to derive a separate mixture model. Such mixture models may then be utilized to predict job pricing for corresponding types of jobs. FIG. 2C depicts such an exemplary framework, in accordance with an embodiment of the present teaching. As illustrated, job completion statistics 220 may include job completion data of a plurality of job types. To allow job pricing in accordance with the present teaching, such composite historic job completion data may be segregated into statistics associated with individual job types, i.e., job type 1 statistics, job type 2 statistics, ..., job type n statistics. Based on statistical distribution associated with each job type, the present teaching may be used to establish a mixture model for characterizing the job completion distribution of the job type via cluster-based modeling. For instance, for job type i, statistics associated therewith may be used to identify k clusters (cluster i-1, ..., cluster i-k) and functions used to model these clusters form a mixture model MMi 230-i. Mixture models for other job types (i.e., MMi 230-1, MM2 230-2, ..., MMn 230-n) may be similarly obtained and used for predicting pricing for different types of jobs.

The method, system, and implementation of the present teaching are summarized herein. In one example, a method for job pricing is provided. Upon receiving information about a new task of a job type, a mixture model representing historic job completion data and including multiple cluster-based models is used to predict job pricing. The multiple cluster-based models characterize corresponding multiple clusters identified from historic job completion data and are used to generate multiple predictions of duration to complete the new task. The predictions generated based on the cluster-based models are integrated based on the mixture model to generate an overall job pricing estimate for the new task.

The method for job pricing as disclosed herein may be realized in an exemplary system or via a software product recorded on a machine readable medium so that job pricing may be performed by utilizing a mixture model with multiple cluster-based models obtained from historic job completion data.

Figure 3A:
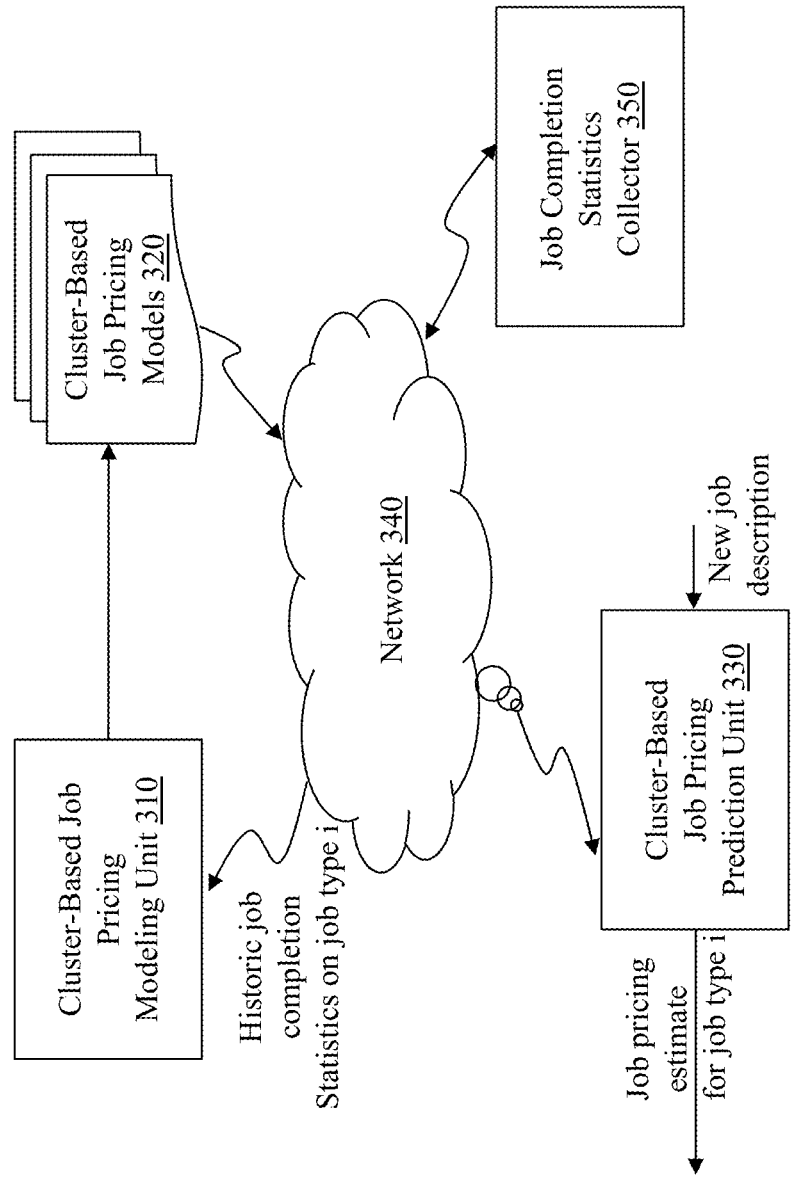
FIG. 3A depicts an exemplary high level system diagram of a job pricing unit for a type of job based on cluster-based job pricing models, in accordance with an embodiment of the present teaching.

Below, the present teaching is described in more detail. FIG. 3A depicts an exemplary high level system diagram of a job pricing framework 300 illustrated via an example type of job based on cluster-based job pricing models, in accordance with an embodiment of the present teaching. In this illustrated embodiment, the cluster-based job pricing framework 300 corresponds to a networked system which comprises a cluster-based job pricing modeling unit 310 and a cluster-based job pricing prediction unit 330. The cluster-based job pricing modeling unit 310 and the cluster-based job pricing prediction unit 330 may be connected via a network 340. The cluster-based job pricing modeling unit 310 is provided for deriving cluster-based job pricing models 320 based on historic job completion statistics accessible, e.g., through network connections via the network 340. Such derived job pricing models may be stored either locally or on the network, e.g., in the cloud, and made accessible by various cluster-based job pricing prediction units (one is illustrated in FIG. 3A) connected to the network 340. Each of the cluster-based job pricing prediction units, when receiving a new job description of a certain job type, may access, through network connection via the network 340, appropriate cluster-based job pricing models 320 to predict a job pricing estimate.

Optionally, framework 300 may also include a job completion statistics collector 350 that connects to the network 340 and may gather job completion statistics from various job execution organizations through network connection via the network 340. In this way, job pricing modeling, job pricing estimation, job execution, and job completion statistics collector may form a closed loop so that the job completion statistics continually collected may be used to adaptively update the cluster-based job pricing models 320 so that the job pricing models 320 may be dynamically adapted to the changing situation. This may be needed because surroundings or environments associated with a particular type of job may vary over time, e.g., tools to be used to perform the job may be updated (e.g., new network protocol), knowledge needed to perform the job may accordingly change, etc. The updated job completion statistics may reflect the changing situations over time so that the cluster-based job pricing models 320 may be adapted based on the dynamics of the collected job completion statistics that may implicitly reflect the changing parameters of different situations.

As illustrated herein, the communications among different units are through the network 340, which may be a single network or a combination of different networks. For example, such a network may be a local area network (LAN), a wide area network (WAN), a public network, a private network, a proprietary network, a Public Telephone Switched Network (PSTN), the Internet, a wireless network, a virtual network, or any combination thereof. Such a network or any portions thereof may be a 4G network, a 5G network, or a combination thereof. The network 340 may also include various network access points, e.g., wired, or wireless access points such as base stations or Internet exchange points, through which a particular unit in framework 300 may connect to the network in order to request certain information (e.g., a cluster-based job pricing prediction unit requests cluster-based job pricing models associated with a particular job type) or transmit requested information to a specific destination (e.g., the job completion statistics collector 350 sends collected statistics to the cluster-based job pricing modeling unit 310. The information may be delivered via the network 340 as bitstreams encoded in accordance with certain industrial standards, such as MPEG4 or H.26x, and the network may be configured to support the transport of such encoded data streams.

In accordance with the present teaching, the cluster-based job pricing modeling unit 310 derives, based on historic job completion statistical distributions, cluster-based job pricing models 320 that individually models corresponding clusters identified from each historic job completion statistical distribution for a job type and such individual cluster-based models together form a mixture model for the job completion distribution of the type of job. Once such cluster-based job pricing models 320 for each job type are obtained, each cluster-based job pricing prediction unit 330 utilizes the cluster-based models 320 to predict job pricing with respect to an input new job description to produce an estimated job pricing.

Figure 3B:
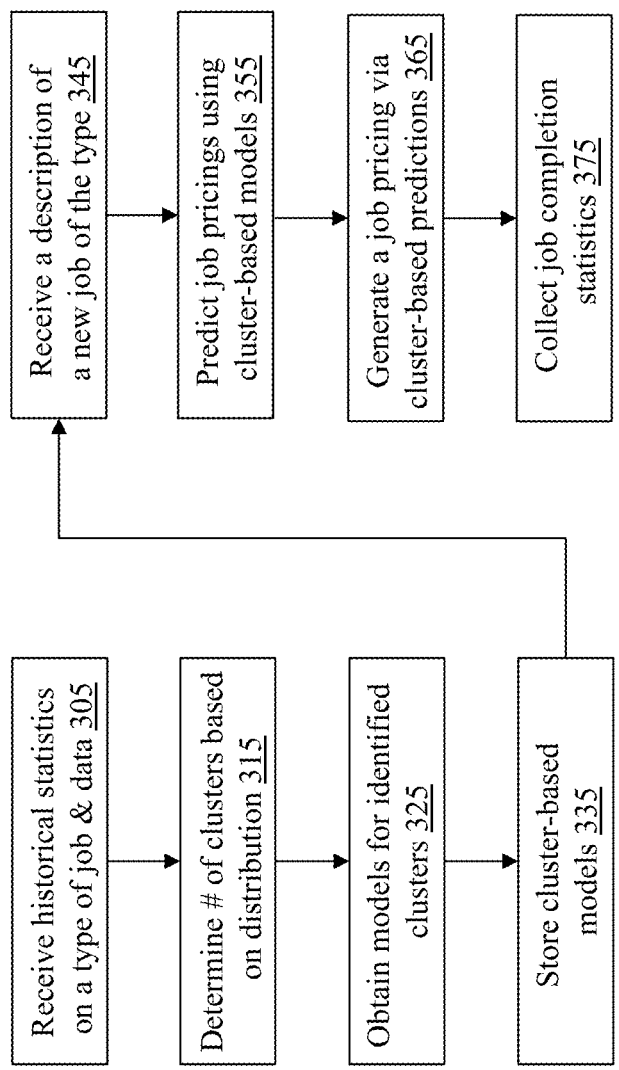
FIG. 3B is a flowchart of an exemplary process of a job pricing unit for a type of job based on cluster-based job pricing models, in accordance with an embodiment of the present teaching.

FIG. 3B is a flowchart of an exemplary process of the job pricing unit 300 based on cluster-based job pricing models 320, in accordance with an embodiment of the present teaching. When the cluster-based job pricing modeling unit 310 receives, at 305, historic data or a job completion distribution related to a type of job, it may first determine, at 315, a number of clusters from the received distribution data. As discussed herein, for each of such identified clusters, a function is used to model the cluster. In accordance with the present teaching, a plurality of such models are obtained, at 325, with respect to corresponding clusters and stored, at 335, as the cluster-based job pricing models 320. Although steps 305-335 are illustratively for generating cluster-based job pricing models for a job completion distribution of one type of job, such cluster-based mixture models may be obtained for different job completion distributions of different types of job. Detailed construct and operation of the cluster-based job pricing modeling unit 310 are provided herein with reference to FIGS. 4A-4D.

The cluster-based job pricing models derived based on job completion distributions associated with different types of jobs may then be used to predict job pricing for a new job corresponding to a given job type. When the cluster-based job pricing prediction unit 330 receives, at 345, a job description of a type of job, it utilizes a mixture model for the type of job having a plurality of cluster-based models and predicts, at 355, based on each of the cluster-based models in the mixture model. The respective job pricing estimates predicted using individual cluster models may then be combined or integrated by the cluster-based job pricing prediction unit 330 to generate, at 365, a job pricing prediction. Optionally, the new job may then be carried out and monitored so that relevant job completion data associated therewith is collected by the job completion statistics collector 350 so that such job completion information may be utilized by the cluster-based job pricing modeling unit 310 to adapt the cluster-based job pricing models 320. Details related to the cluster-based job pricing prediction unit 330 are provided with reference to FIGS. 5A-5C.

Figure 4A:
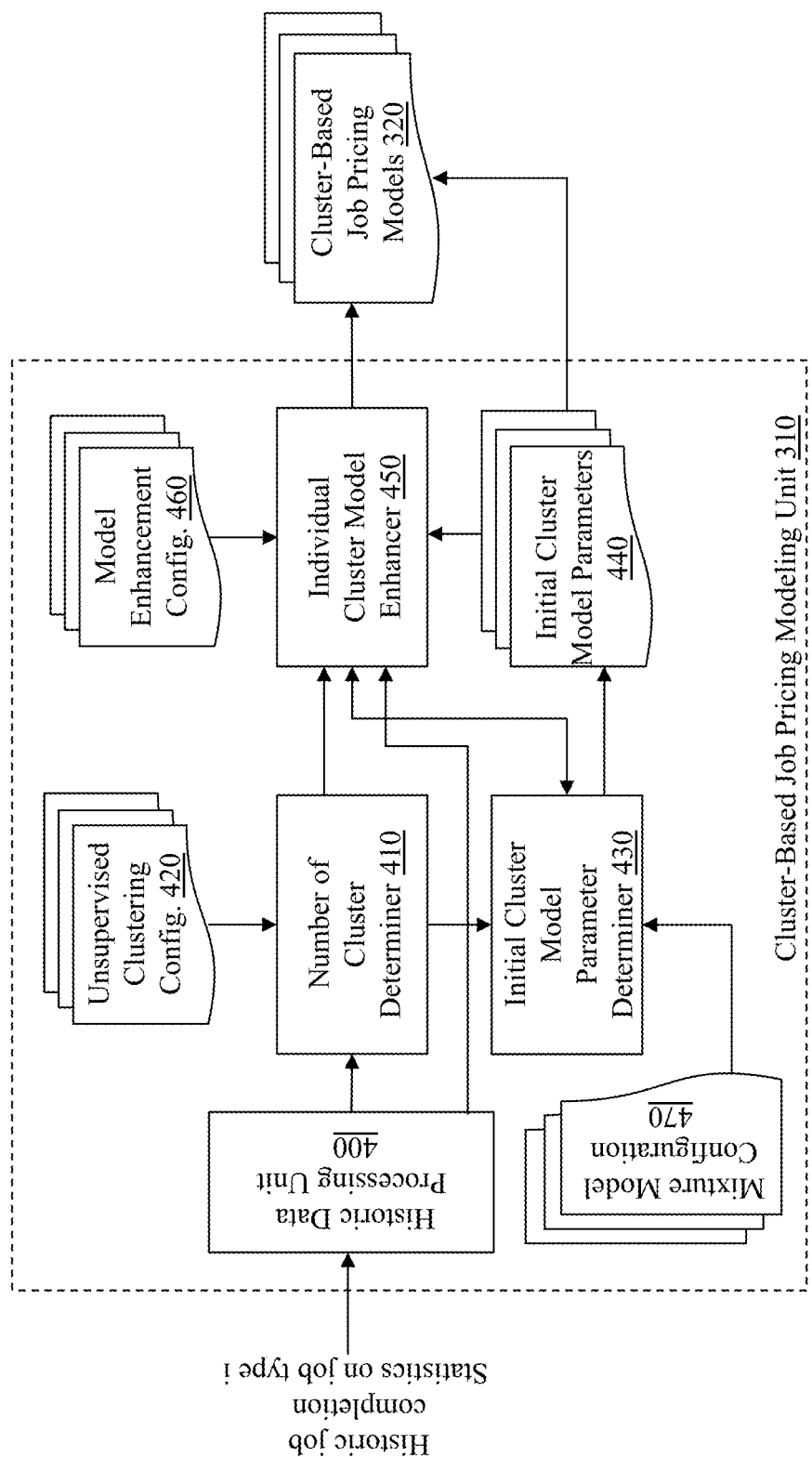
FIG. 4A depicts an exemplary high level system framework of a cluster-based job pricing modeling unit, in accordance with an exemplary embodiment of the present teaching.

FIG. 4A depicts an exemplary high level system diagram of the cluster-based job pricing modeling unit 310, in accordance with an exemplary embodiment of the present teaching. As discussed herein, the cluster-based job pricing modeling unit 310 is provided for deriving a mixture model for a type of job based on job completion distribution for the type of job, where the mixture model is formed by a plurality of cluster-based models. In the illustrated embodiment, the cluster-based job pricing modeling unit 310 comprises a historic data processing unit 400, a cluster determiner 410 an initial cluster model parameter determiner 430, and an individual cluster model enhancer 450. The historic data processing unit 400 may be provided for processing the input historic job completion statistics so that the input data is suitable for further data analytics in order to determine the number of clusters or to derive individual cluster-based models. In some embodiments, the historic data may also be processed to as to derive some initial parameters associated with clusters identified from the distribution.

Figure 4B:
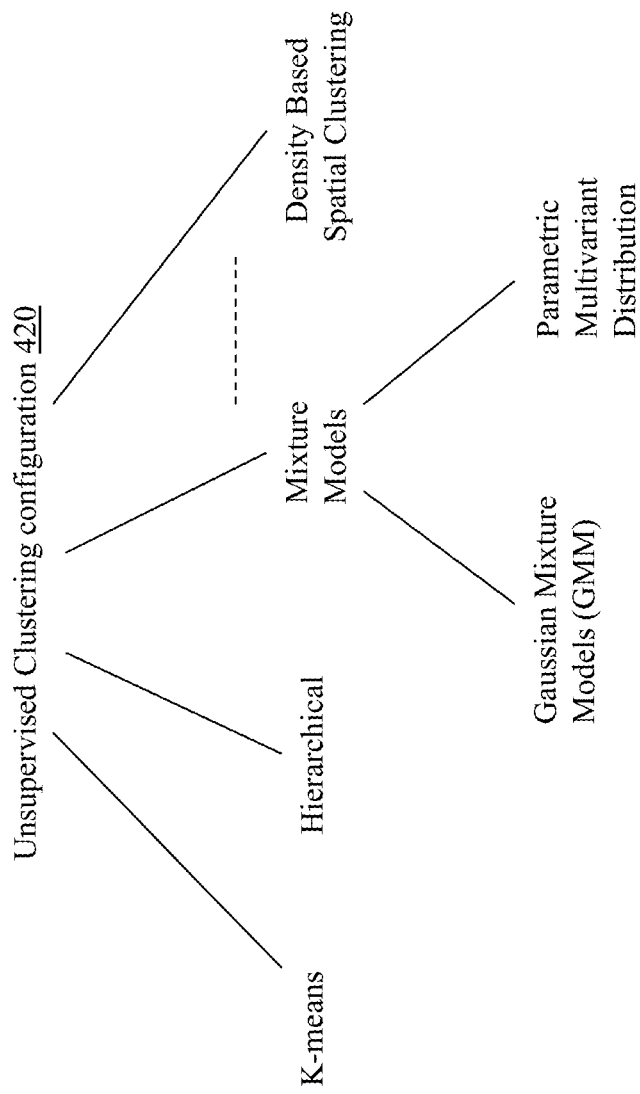
FIG. 4B illustrates exemplary configuration for different types of unsupervised clustering.

The processed data may then be sent to the cluster determiner 410 where appropriate method is selected, e.g., based on unsupervised clustering configuration 420 and used to analyze the input job completion distribution data and estimate the number of clusters from the distribution. As discussed here, the number of clusters in a given historic job completion distribution may be determined using different approaches, including but not limited to, unsupervised clustering. FIG. 4B illustrates exemplary configuration of different unsupervised clustering methods that may be applied for identifying a number of clusters given a distribution of data points. As shown, the unsupervised clustering configuration 420 may specify a plurality of unsupervised clustering algorithms that may be selected, including k-means unsupervised clustering algorithm, hierarchical unsupervised clustering algorithm, mixture models unsupervised clustering, and density-based spatial clustering algorithm.

With the number of clusters being estimated from the input distribution, the initial cluster model parameter determiner 430 may proceed to select a mixture model to represent the overall distribution based on a mixture model configuration 470. In some embodiments, the mixture model configuration 470 may specify different mixture models that may be used to model a job completion distribution and each of which may be specified to use some cluster-based models for clusters identified from the distribution. For instance, a mixture model may be a Gaussian mixture model (i.e., GMM) with component Gaussians used to model clusters in the distribution. With a mixture model selected, the initial cluster model parameters determiner 430 may initialize the parameters associated with a function used to model each cluster. For instance, if a GMM model is selected and five clusters are identified from the input job completion distribution, then each of the five clusters may be modeled by a Gaussian function whose initial parameters, such as a mean and a standard deviation, may be estimated based on the data in the cluster. In this case, GMM=Comb (Gi(Mi, STi), $1<=i<=5$), where Comb represents an integration or mixture model that combines the values from different component models, Gi denotes the ith Gaussian function representing the ith cluster, Mi denotes the mean of the ith Gaussian function, and STi denotes the standard deviation of the ith Gaussian function.

Figure 4C:
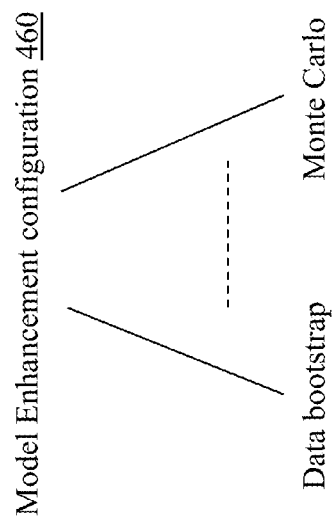
FIG. 4C illustrates exemplary types of data distribution enhancement approaches.

In some embodiments, individual cluster-based models with initial estimated parameters may be enhanced. For example, data in each cluster may be enhanced using a selected method to generate an enhanced cluster which may then be used to refine the parameters associated with the cluster-based model for the cluster. FIG. 4C illustrates some exemplary types of data enhancement approaches that may be configured in model enhancement configuration 460 and may be selected in operation to enhance or refine each of the clusters. As shown, the model enhancement configuration 460 may specify, e.g., data bootstrap or Monte Carlo approaches that may be selected, as operational parameters, based on application needs, to be applied to each or some of the identified clusters to enhance the distribution of the data in the clusters and accordingly the parametric models used to represent such clusters. Such enhancement may be employed for the purpose of reducing the uncertainty associated with a cluster and, hence, the predictive power of the model that characterizes the cluster.

In some embodiments, a Monte Carlo simulation-based data enhancement approach may be applied to each cluster, during which the initial model parameters associated with a function for the cluster (e.g., a Gaussian function) may be used to randomly generate additional data points and then estimate the probabilities of these data points. Such estimated probabilities may then be used to refine the parameters of the function. The Monte Carlo enhancement process may be performed iteratively to continually improve the distribution and the model until some convergence conditions are met. During this process, parameters of the model representing a cluster are also iteratively updated.

In some exemplary implementation of a Monte Carlo simulation process as applied to a cluster, a function, such as a Gaussian function, representing the cluster may be used to generate (according to the probabilities of the underline function) additional data points (e.g., job durations) for the cluster that yields a modified cluster distribution. The data points in the cluster may be grouped into bins (e.g., as illustrated in FIGS. 1 and 2A) and each of such grouped bins may be defined as a ticket. For each ticket or grouped bin, a bin count may be derived and used to calculate a median duration for the bin so that the distribution of the medians of the bins may simulate the distribution of the cluster. When the process is iterated, the distribution of the cluster represented by the group medians may be refined over time. In this process, for each ticket, calculate and assign the duration by taking a random value from the duration ratios from the above step based on probabilities as duration ratio. Based on the continually enhanced cluster distribution by Monte Carlo simulation, the parameters (e.g., mean) of the function representing the cluster may be accordingly refined.

In some embodiments, a bootstrap approach may also be utilized to enhance data in a cluster so that the cluster may have an improved level of expressive power associated with the underlying distribution. The bootstrapped cluster data may then be used to accordingly refine the parameters of a function characterizing the distribution of the cluster by fitting the function more precisely with the enhanced cluster data.

Figure 4D:
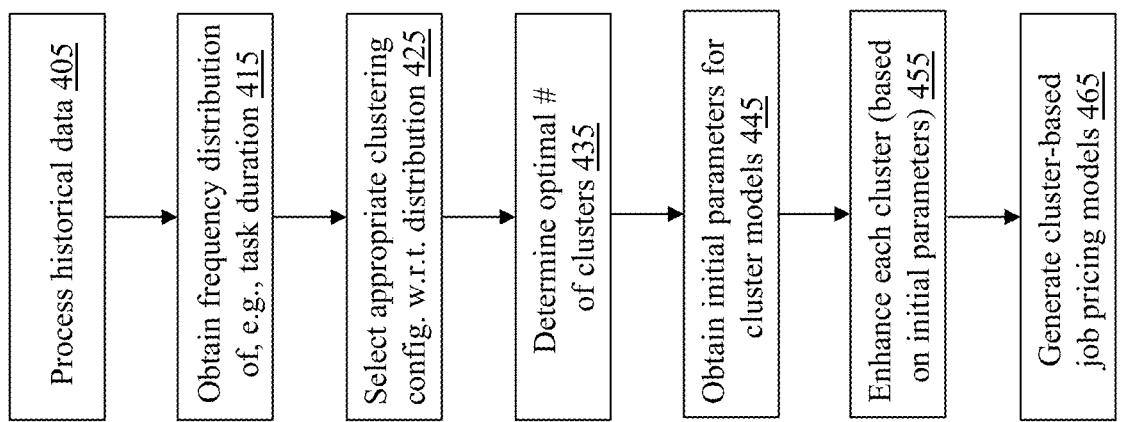
FIG. 4D is a flowchart of an exemplary process of a cluster-based job pricing modeling unit, in accordance with an exemplary embodiment of the present teaching.

FIG. 4D is a flowchart of an exemplary process of the cluster-based job pricing modeling unit 310, in accordance with an exemplary embodiment of the present teaching. When the historic data processor 400 receives the historic job completion statistics (for a particular job type), it processes, at 405, the received input to obtain, at 415, e.g., a distribution of frequency of task durations (such as the ones illustrated in FIGS. 1 and 2A). To determine a number of clusters from the distribution, the cluster determiner 410 selects, at 425 (from the unsupervised clustering configuration 420), an appropriate unsupervised clustering method and determines, at 435, the number of clusters from the distribution. As discussed herein, a job completion distribution for a type of job may be modeled by a mixture model, which includes a plurality of cluster-based models for corresponding clusters in the distribution. At 445, when the initial cluster model parameter determiner 430 selects a mixture model from the ones specified in the mixture model configuration 470, it obtains, according to the selected mixture model, initial parameters for each of the cluster-based models of the mixture model based on each corresponding cluster and saves such estimated initial cluster model parameters to storage 440 for initial cluster model parameters. For instance, if a GMM is selected, a mean and/or a standard deviation for each of the component Gaussian model may be estimated initially based on a corresponding cluster.

As discussed herein, a component model in a mixture model may be enhanced. This is performed by the individual cluster model enhancer 450 at 455. In some embodiments, enhancement may be achieved through a Monte Carlo simulation process. In this case, the initial estimated cluster model parameters (stored in 440) may be used by the initial cluster model enhancer 450 in an iterative process, as discussed herein. In this process, the cluster model parameters may be updated in each iteration until some criterion is met. The enhanced parameters represent refined cluster-based models and upon convergence, the refined model parameters may be used to generate, at 465, the cluster-based job pricing models 320 for each type of job. The enhancement of estimated model parameters based on clusters may be optional. In some situations, the estimated initial cluster model parameters stored in 440 may be used directly, without further enhancement, to generate, at 465, the cluster-based job pricing models 320.

In some embodiments, the individual cluster model enhancer 450 may also be configured to enhance a cluster before a corresponding cluster model is obtained via, e.g., data bootstrapping as discussed herein. In this case, the clusters delineated by the cluster determiner 410 may be used by the individual cluster model enhancer 450 with, e.g., a bootstrapping process, which yields an enhanced cluster which may then be relied on by the initial cluster model parameter determiner 430 to estimate initial parameters of a model used to represent the enhanced cluster. In this case, as the data used to derive cluster models and parameters thereof are enhanced, the derived cluster-based models are also enhanced. In some embodiments, the initial cluster model parameters derived based on an enhanced cluster may be further enhanced by the individual cluster model enhancer 450 using, e.g., Monte Carlo simulation process as described herein. In other embodiments, the initial cluster model parameters estimated based on bootstrapped clusters may be directly used. In either case, the cluster-based job pricing models 320 are generated, at 465, based on the parameters of the models representing the enhanced clusters.

The enhancement may be optional. In some situations, the cluster data as delineated by the cluster determiner 410 from the input historic data may be used, without enhancement, to estimate the initial parameters of models for the identified clusters. Such estimated initial cluster model parameters (stored in 440) may then be used directly, without refining the initial estimated parameters, as the cluster-based job pricing models 320.

Figure 5A:
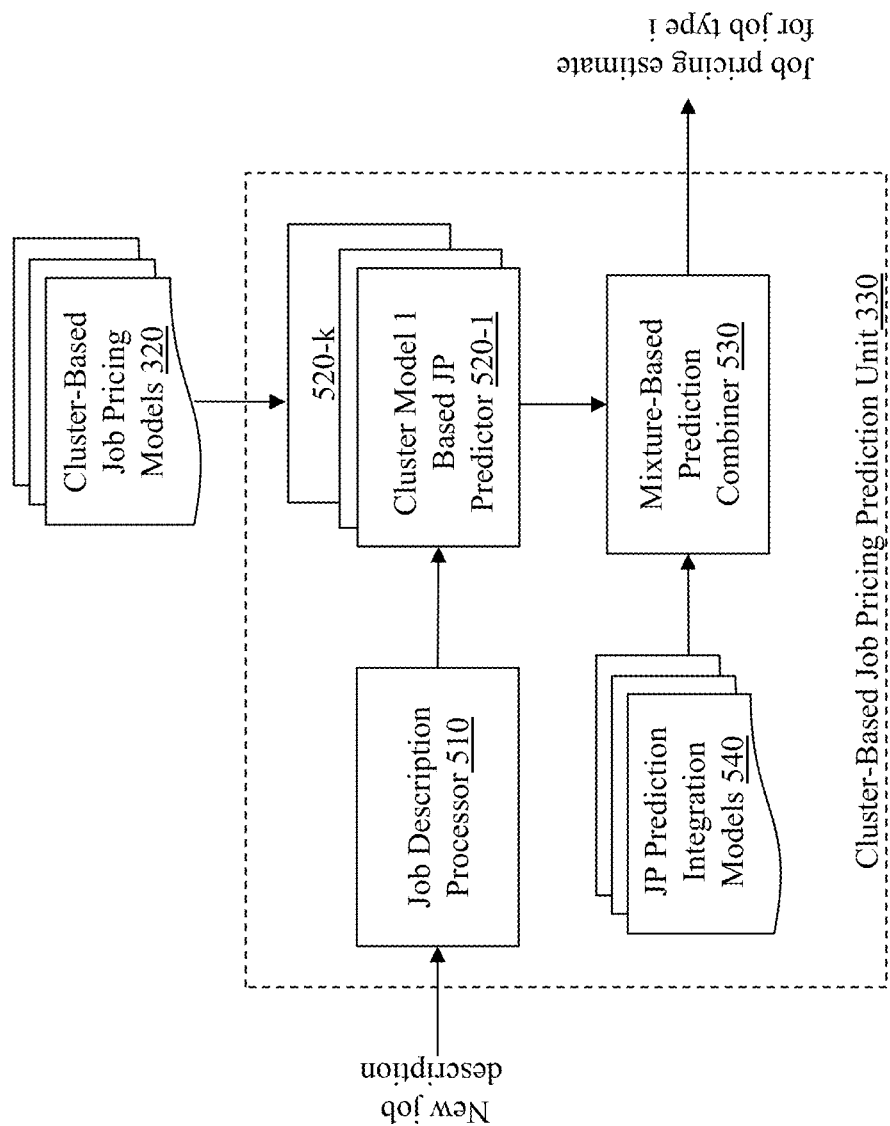
FIG. 5A depicts an exemplary high level system diagram for a cluster-based job pricing prediction unit, in accordance with an exemplary embodiment of the present teaching.

FIG. 5A depicts an exemplary high level system diagram for the cluster-based job pricing prediction unit 330, in accordance with an exemplary embodiment of the present teaching. In this illustrated embodiment, the cluster-based job pricing prediction unit 330 comprises a job description processor 510, a plurality of cluster model-based job pricing (JP) predictor 520, and a mixture-based prediction combiner 530. The plurality of cluster model-based JP predictors 520 includes k predictors, i.e., cluster model 1 based JP predictor 520-1, . . . , and cluster model k based JP predictor 520-$k$, each of which may be responsible for predicting a job pricing estimate based on one component model in the mixture that represents a corresponding cluster. The predicted JP estimates using different cluster models are then combined by the mixture-based prediction combiner 530, in accordance with configured job pricing (JP) prediction integration models 540, to produce a job pricing estimate for a given type of job.

Figure 5B:
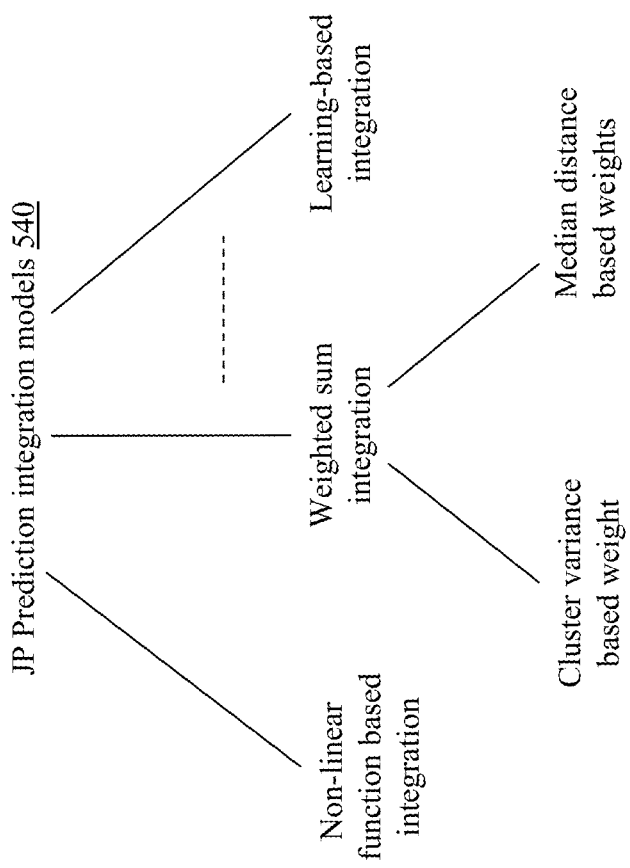
FIG. 5B provides exemplary types of job pricing prediction integration models, in accordance with an exemplary embodiment of the present teaching.

FIG. 5B provides exemplary types of job pricing prediction integration models, in accordance with an exemplary embodiment of the present teaching. According to the present teaching, a job completion distribution is divided into different clusters (as shown in FIG. 2A) and for each cluster so identified, a function is used as a cluster-based model that characterizes the data distribution in the cluster. Although each cluster may have a limited number of points within a range, the function used to represent the distribution of the cluster may not be limited by this range. As such, functions used to model different clusters overlap in tail regions. For instance, GMM may be selected to represent a job completion distribution. With the GMM model, the component Gaussian functions for different clusters of the distribution exhibit multimodal distributions so that they may be used to simultaneously predict the probability that a data point belongs to each of the clusters. In this case, the GMM may be used to estimate the probability with respect to each of the cluster distributions. That is, if there are k clusters, given a task duration (a data point), k predictions may be estimated, and the overall job pricing estimation may then be derived from the k predictions based on some integration or combination scheme.

As illustrated in FIG. 5B, the JP estimates (predicted by various cluster model-based JP predictors 520 based on corresponding cluster models) may be combined in accordance with any of the exemplary integration schemes, including, e.g., some non-linear function, a weighted sum, or some non-linear integration learned via machine learning. In some embodiments, a weighted sum integration scheme may use a formula to combine cluster-based predictions and compute an overall job pricing estimate by applying a weight to each of the predictions where the weight is determined in a certain way. For example, in some embodiments, the weight may be determined based on cluster variance observed. In some embodiments, the weight may be determined based on a distance between the centroid of the cluster model and the median of the distribution. Such a determined weight may signify the contribution of each prediction towards the overall job pricing prediction and may be determined in any way that is suitable to the application in hand.

Figure 5C:
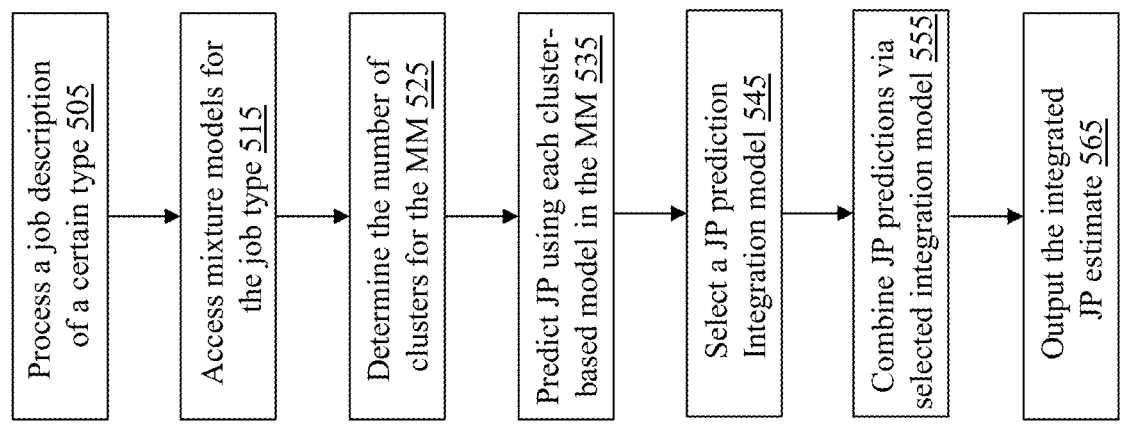
FIG. 5C is a flowchart of an exemplary process of a cluster-based job pricing prediction unit, in accordance with an exemplary embodiment of the present teaching.

FIG. 5C is a flowchart of an exemplary process of the cluster-based job pricing prediction unit 330, in accordance with an exemplary embodiment of the present teaching. When the job description processor 510 receives a new job description of a certain type, it processes, at 505, the new job description. To appropriately obtain cluster-based JP estimation, information about the mixture model representing the job type of the new job description is accessed, at 515, and the number of clusters associated with the given job type is determined, at 525, based on the information about the mixture model. With the number of clusters related to the mixture model for the job type, cluster-based models for different clusters are accessed and used to predict, at 535, job pricings with respect to different cluster models. To generate an overall job pricing estimate based on the predictions generated using cluster-based models, the mixture-based prediction combiner 530 selects, at 545, a job pricing prediction integration model from the JO prediction integration models 540 and combines, at 555, different predictions made using cluster-based models using the selected integration model to generate an integrated job pricing estimate which is output at 565.

It is noted that the cluster-based modeling and cluster-model based prediction mechanisms as disclosed herein with respect to FIGS. 4A-5C are directed to a type of job and the operations may be applied to any job type. Although the disclosure is provided with some concrete examples, such discussions are merely for the purpose of illustration and it is understood that such discussions are not intended as limitation to the scope of the present teaching. Different methods, either known today or devised in the future, may be used to determine the number of clusters and application of any of them for determining the number of clusters in an unsupervised manner is still within the scope of the present teaching. Similarly, any type of mixture model of any type of scheme for integrating multiple predictions to obtain an overall job pricing prediction, whether known today or devised in the future, may be utilized to model a job pricing distribution and to integrate multiple predictions within the scope of the present teaching.

Figure 6:
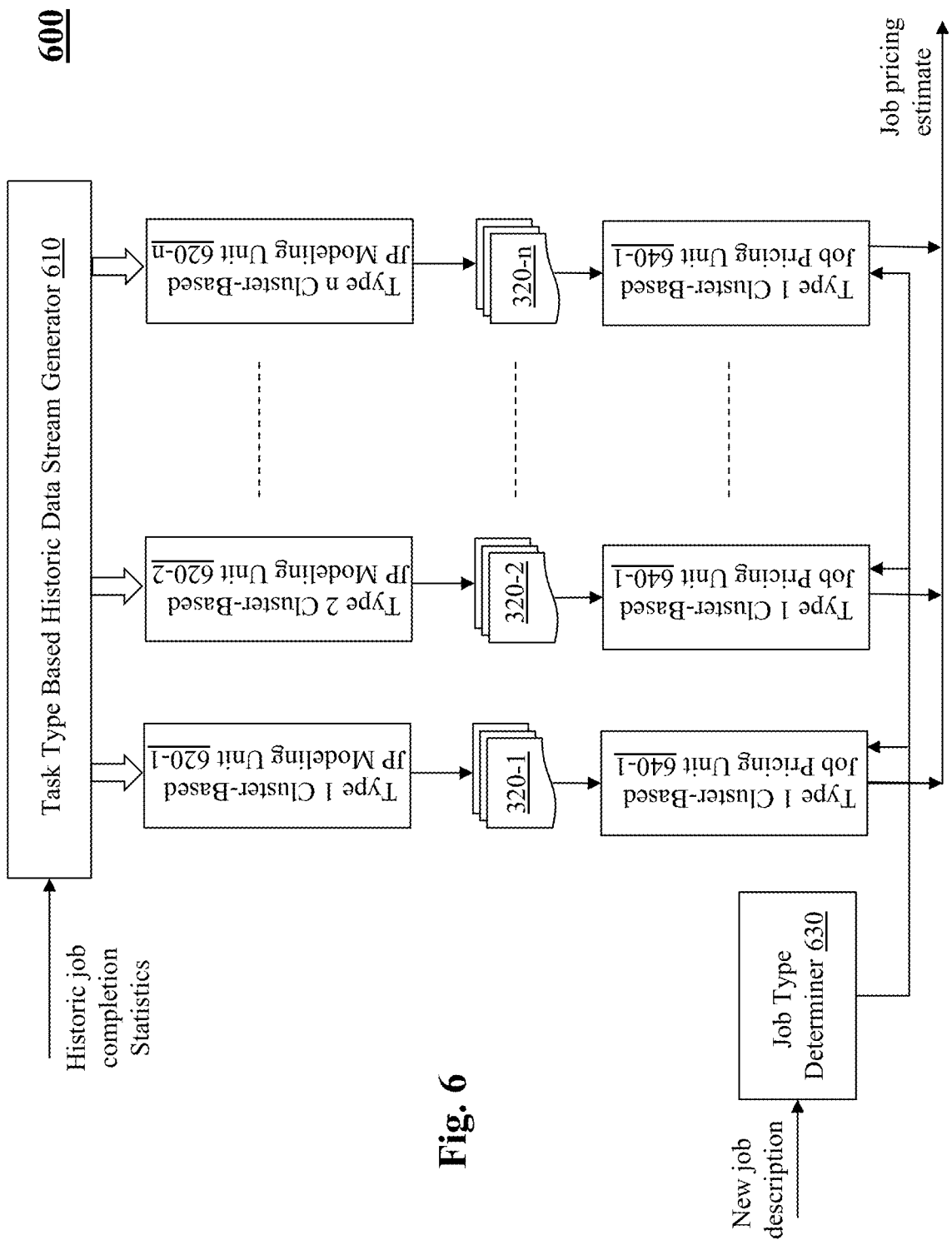
FIG. 6 depicts an exemplary high level system diagram of a job pricing system configured for modeling and predicting job pricing for different types of job, in accordance with an embodiment of the present teaching.

FIG. 6 depicts an exemplary high level system diagram of a job pricing system 600 configured for modeling and predicting job pricing for different types of job, in accordance with an embodiment of the present teaching. The job pricing system 600 applies the present teaching as disclosed herein to perform job pricing for different types of job based on cluster-based approach that models clusters of historic data and integrates cluster-based predictions via mixture models. This illustrated job pricing system 600 comprises a task type based historic data stream generator 610, n cluster-based JP modeling units 620-1 to 620-$n$ for generating respective mixture models for corresponding job types, a job type determiner 630, and n cluster-based job pricing estimate generators 640-1 to 640-$n$ for generating job pricing estimates for different types of job based on corresponding mixture models.

In operation, the system operates in two stages, one for deriving mixture models for different types of job and the other for predicting a job pricing estimate for a given new job description based on a mixture model derived for a type of job consistent with the new job description. These two stages of operation can be carried out concurrently or separately. The components of the system 600 may be distributed and different components may be operating in parallel. In deriving mixture models for different types of job, when the task type based historic data stream generator 610 receives historic job completion statistics, it may classify the received data into different categories, each of which relates to one type of job so that each category of job completion statistics may be transmitted to a corresponding cluster-based JP modeling unit 620 provided for deriving a mixture model for the respective type of job. This creates n mixture models 320-1 to 320-$n$, each of which includes a plurality of cluster-based models representing the clusters identified from the job completion statistics associated with a respective type of job.

Utilizing the derived mixture models for different types of job, when the job type determiner 630 receives a new job description, it may first determine the type of the new job and then may accordingly activate an appropriate cluster-based job pricing unit 640 with the received job description. The activated cluster-based job pricing unit 640 may then retrieve the mixture model that models the type of the job and generate a job pricing estimated in accordance with the present teaching, i.e., predicting a job pricing estimate based on each of the cluster-based models included in the retrieved mixture model and then combining the cluster-based predictions in accordance with the integration scheme associated with the mixture model to produce a job pricing estimate for the new job.

Figure 7:
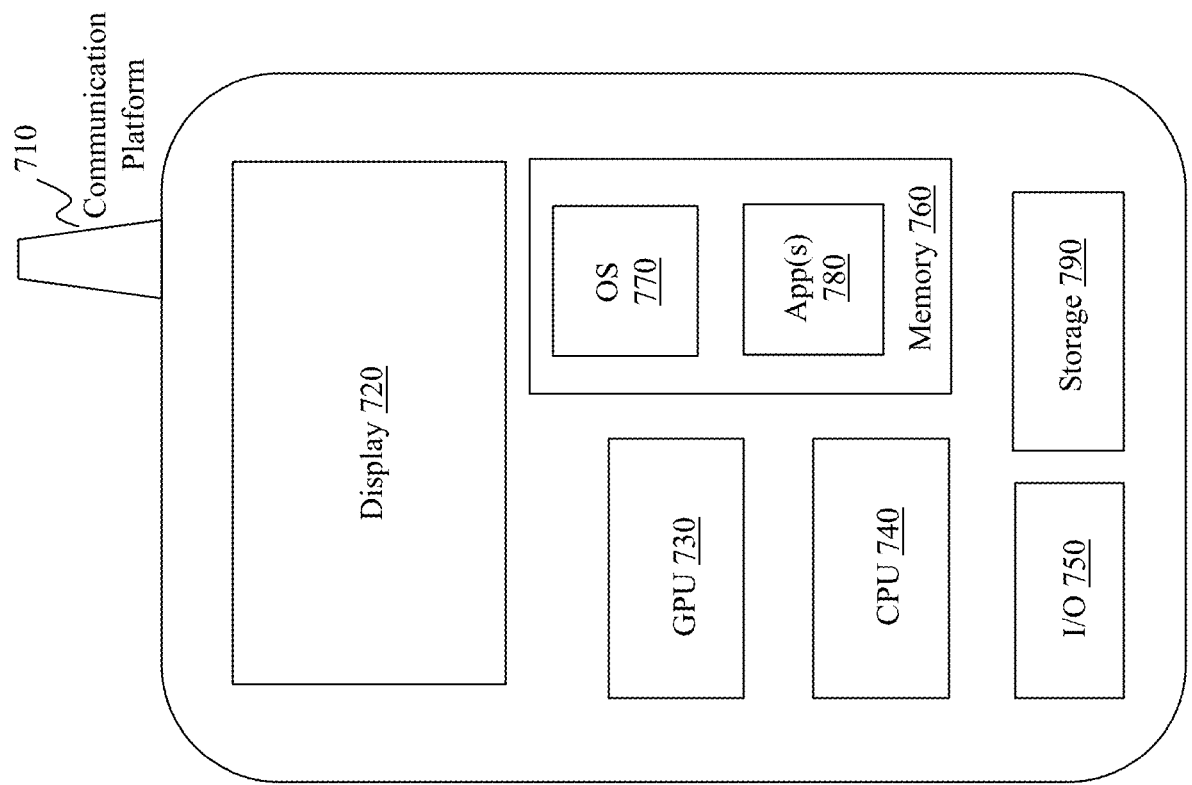
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but not limited to, a smart phone, a tablet, a music player, a handled gaming console, a global positioning system (GPS) receiver, and a wearable computing device, or a mobile computational unit in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 750. Any other suitable component, including but not limited to a system bus or a controller (not shown), may also be included in the mobile device 700. As shown in FIG. 7, a mobile operating system 770 (e.g., iOS, Android, Windows Phone, etc.) and one or more applications 780 may be loaded into memory 760 from storage 790 in order to be executed by the CPU 740. The applications 780 may include a user interface or any other suitable mobile apps for information exchange, analytics, and management according to the present teaching on, at least partially, the mobile device 700. User interactions, if any, may be achieved via the I/O devices 750 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 800 may be used to implement any component or aspect of the framework as disclosed herein. For example, the information processing and analytical method and system as disclosed herein may be implemented on a computer such as computer 800, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random-access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method, comprising:
   receiving information about a new task to be completed;
   determining a type of the new task;
   accessing, via a network, a mixture model derived for the type based on historic data on resource allocation to tasks of the type and adaptively updated based on a changing situation associated with the type of task, wherein the mixture model includes a plurality of cluster-based models, each of which characterizes one of a plurality of clusters identified from the historic data on resource allocation to tasks of the type, wherein the plurality of clusters are determined via unsupervised clustering, and each of the plurality of clusters corresponds to a respective range of resource allocation indicative of a respective different range of time duration to complete the type of task;
   generating a plurality of predictions of resource allocation to the new task based on the plurality of cluster-based models, wherein each of the plurality of predictions estimates resource allocation to the new task and is generated in accordance with a respective one of the plurality of cluster-based models;
   integrating the plurality of predictions based on the mixture model; and
   generating an overall estimate of resource allocation to the new task based on a result of integrating the plurality of predictions.

2. The method of claim 1, wherein
   the mixture model models the historic data associated with the type; and
   each of the plurality of cluster-based models of the mixture model corresponds to a parametric function with parameters obtained based on data from a respect one of the plurality of clusters.

3. The method of claim 2, wherein the plurality of cluster-based models forms the mixture model.

4. The method of claim 1, wherein the mixture model for the type is derived by:
   receiving the historic data of the type;
   determining a number of the plurality of clusters from the historic data in an unsupervised manner; and
   for each of the plurality of clusters,
      estimating one or more parameters of a corresponding one of the plurality of cluster-based models based on data related to the cluster, and
      generating a cluster-based model for the cluster based on the one or more parameters.

5. The method of claim 4, further comprising one or more of:
   analyzing information included in the cluster to generate the data that represents an enhanced distribution of the cluster; and
   refining the one or more parameters via a Monte Carlo process to enhance the cluster-based model for the cluster.

6. The method of claim 1, wherein the step of integrating the plurality of predictions comprises:
   receiving the plurality of predictions;
   selecting an integration model to be used to combine the plurality of predictions; and
   combining the plurality of predictions in accordance with the integration model.

7. The method of claim 1, wherein the integration model is one of:
   a weighted sum of the plurality of predictions, wherein weights associated with the corresponding plurality of predictions are determined based on some criterion;
   a non-linear function of the plurality of predictions; and
   embeddings of a neural network that takes the plurality of predictions as an input and outputs a combined prediction, wherein the embeddings of the neural network are obtained via machine learning based on training data.

8. A machine readable and non-transitory medium having information recorded thereon, where the information, when read by the machine, causes the machine to perform the following steps:
   receiving information about a new task to be completed;
   determining a type of the new task;
   accessing, via a network, a mixture model derived for the type based on historic data on resource allocation to tasks of the type and adaptively updated based on a changing situation associated with the type of task, wherein the mixture model includes a plurality of cluster-based models, each of which characterizes one of a plurality of clusters identified from the historic data on resource allocation to tasks of the type, wherein the plurality of clusters are determined via unsupervised clustering, and each of the plurality of clusters corresponds to a respective range of resource allocation indicative of a respective different range of time duration to complete the type of task;

generating a plurality of predictions of resource allocation to the new task based on the plurality of cluster-based models, wherein each of the plurality of predictions estimates resource allocation to the new task and is generated in accordance with a respective one of the plurality of cluster-based models;

integrating the plurality of predictions based on the mixture model; and generating an overall estimate of resource allocation to the new task based on a result of integrating the plurality of predictions.

9. The medium of claim 8, wherein
the mixture model models the historic data associated with the type; and
each of the plurality of cluster-based models of the mixture model corresponds to a parametric function with parameters obtained based on data from a respect one of the plurality of clusters.

10. The medium of claim 9, wherein the plurality of cluster-based models forms the mixture model.

11. The medium of claim 8, wherein the mixture model for the type is derived by:
receiving the historic data of the type;
determining a number of the plurality of clusters from the historic data in an unsupervised manner; and
for each of the plurality of clusters,
estimating one or more parameters of a corresponding one of the plurality of cluster-based models based on data related to the cluster, and
generating a cluster-based model for the cluster based on the one or more parameters.

12. The medium of claim 11, further comprising one or more of:
analyzing information included in the cluster to generate the data that represents an enhanced distribution of the cluster; and
refining the one or more parameters via a Monte Carlo process to enhance the cluster-based model for the cluster.

13. The medium of claim 8, wherein the step of integrating the plurality of predictions comprises:
receiving the plurality of predictions;
selecting an integration model to be used to combine the plurality of predictions; and
combining the plurality of predictions in accordance with the integration model.

14. The medium of claim 8, wherein the integration model is one of:
a weighted sum of the plurality of predictions, wherein weights associated with the corresponding plurality of predictions are determined based on some criterion;
a non-linear function of the plurality of predictions; and
embeddings of a neural network that takes the plurality of predictions as an input and outputs a combined prediction, wherein the embeddings of the neural network are obtained via machine learning based on training data.

15. A system, comprising:
a description processor implemented by a processor and configured for
receiving information about a new task to be completed, and
determining a type of the new task;
a plurality of cluster-mode based predictors implemented by a processor and configured for
accessing, via a network, a plurality of cluster-based models related to a mixture model that is derived for the type based on historic data on resource allocation to tasks of the type and adaptively updated based on a changing situation associated with the type of task, wherein each of the plurality of cluster-based models characterizes one of a plurality of clusters identified from the historic data on resource allocation to tasks of the type, wherein the plurality of clusters are determined via unsupervised clustering, and each of the plurality of clusters corresponds to a respective range of resource allocation indicative of a respective different range of time duration to complete the type of task, and
generating a plurality of predictions of resource allocation to the new task based on the plurality of cluster-based models, wherein each of the plurality of predictions of resource allocation estimates resource allocation to the new task and is generated in accordance with a respective one of the plurality of cluster-based models; and
a cluster-based prediction combiner implemented by a processor and configured for
integrating the plurality of predictions based on the mixture model, and
generating an overall estimate of resource allocation to the new task based on a result of integrating the plurality of predictions.

16. The system of claim 15, wherein
the mixture model models the historic data associated with the type; and
each of the plurality of cluster-based models of the mixture model corresponds to a parametric function with parameters obtained based on data from a respect one of the plurality of clusters.

17. The system of claim 15, further comprising a cluster-based modeling unit implemented by a processor and configured for deriving the mixture model for the type, wherein the cluster-based modeling unit comprises:
a historic data processing unit implemented by a processor and configured for receiving the historic data of the type;
a number of cluster determiner implemented by a processor and configured for determining a number of the plurality of clusters from the historic data in an unsupervised manner; and
an initial cluster model parameter determiner implemented by a processor and configured for, with respect to each of the plurality of clusters,
estimating one or more parameters of a corresponding one of the plurality of cluster-based models based on data related to the cluster, and
generating a cluster-based model for the cluster based on the one or more parameters.

18. The system of claim 17, further comprising an individual cluster model enhancer implemented by a processor and configured for carrying out one or more of:

analyzing information included in the cluster to generate the data that represents an enhanced distribution of the cluster; and refining the one or more parameters via a Monte Carlo process to enhance the cluster-based model for the cluster.

19. The system of claim 15, wherein the cluster-based prediction combiner is configured to integrate the plurality of predictions by:

receiving the plurality of predictions;

selecting an integration model to be used to combine the plurality of predictions; and combining the plurality of predictions in accordance with the integration model.

20. The system of claim 15, wherein the integration model is one of:

a weighted sum of the plurality of predictions, wherein weights associated with the corresponding plurality of predictions are determined based on some criterion;

a non-linear function of the plurality of predictions; and embeddings of a neural network that takes the plurality of predictions as an input and outputs a combined prediction, wherein the embeddings of the neural network are obtained via machine learning based on training data.

* * * * *